(12) United States Patent
Henderson et al.

(10) Patent No.: US 11,381,332 B2
(45) Date of Patent: Jul. 5, 2022

(54) MEDIA BREAK WINDOW

(71) Applicant: Global Media Group Services Limited, London (GB)

(72) Inventors: David Henderson, London (GB); Liam Whiteside, London (GB)

(73) Assignee: Global Media Group Services Limited, London (GB)

(*) Notice: Subject to any disclaimer, the term of this patent is extended or adjusted under 35 U.S.C. 154(b) by 284 days.

(21) Appl. No.: 16/755,828

(22) PCT Filed: Oct. 12, 2018

(86) PCT No.: PCT/GB2018/052949
§ 371 (c)(1),
(2) Date: Apr. 13, 2020

(87) PCT Pub. No.: WO2019/073265
PCT Pub. Date: Apr. 18, 2019

(65) Prior Publication Data
US 2020/0336230 A1 Oct. 22, 2020

(30) Foreign Application Priority Data
Oct. 13, 2017 (GB) ..................... 1716898

(51) Int. Cl.
*H04H 20/10* (2008.01)
*G06Q 30/02* (2012.01)
(Continued)

(52) U.S. Cl.
CPC ....... *H04H 20/103* (2013.01); *G06Q 30/0277* (2013.01); *H04H 60/06* (2013.01); *H04H 60/82* (2013.01); *H04L 65/601* (2013.01)

(58) Field of Classification Search
CPC ...... H04H 20/103; H04H 60/06; H04H 60/82; H04H 2201/40; H04H 20/106;
(Continued)

(56) References Cited

U.S. PATENT DOCUMENTS

2002/0061067 A1* 5/2002 Lyons .............. H04N 21/23406
375/E7.022
2003/0046687 A1 3/2003 Hodges et al.
(Continued)

FOREIGN PATENT DOCUMENTS

| EP | 2039154 A2 | 3/2009 |
| EP | 2804376 A1 | 4/2009 |
| WO | WO 2010/001410 A2 | 1/2010 |

OTHER PUBLICATIONS

International Search Report and Written Opinion dated Nov. 13, 2018 for International Application No. PCT/GB2018/052949, filed Oct. 12, 2018.
(Continued)

*Primary Examiner* — Ankur Jain
(74) *Attorney, Agent, or Firm* — Mintz Levin Cohn Ferris Glovsky and Popeo, P.C.

(57) ABSTRACT

A method for playing out a media program including a primary programming. The method includes storing the primary programming; forming first and second sets of content for play-out during a break in the primary programming, where the second set's duration differs by less than a predetermined amount from the duration of the first set of
(Continued)

content transmitting, by a first mechanism, a base program including the primary programming and subsequently, during the break, the first set of content, and after the break, the primary programming; and transmitting, by a second mechanism, the primary programming at a first time offset to the transmitting by the first mechanism before the break and subsequently, during the break, the second set of content and after the break, the primary programming at a second time offset to the transmitting by the first mechanism, after the break, the first and second time offsets being different.

21 Claims, 2 Drawing Sheets

(51) Int. Cl.
*H04H 60/06* (2008.01)
*H04H 60/82* (2008.01)
*H04L 65/60* (2022.01)

(58) Field of Classification Search
CPC .... H04H 60/33; H04H 60/63; G06Q 30/0277; G06Q 30/0251; G06Q 30/0269; H04L 65/601; H04N 21/812; H04N 21/258; H04N 21/26233; H04N 21/2625; H04N 21/6112; H04N 21/6125; H04N 21/26241
See application file for complete search history.

(56) References Cited

U.S. PATENT DOCUMENTS

| | | | |
|---|---|---|---|
| 2004/0093394 A1 | 5/2004 | Weber et al. | |
| 2007/0261072 A1* | 11/2007 | Boulet | H04N 21/6582 725/14 |
| 2010/0031162 A1* | 2/2010 | Wiser | H04N 21/431 715/747 |
| 2010/0205049 A1* | 8/2010 | Long | G06Q 30/0252 705/14.5 |
| 2013/0144723 A1 | 6/2013 | Green et al. | |
| 2014/0068662 A1 | 3/2014 | Kumar | |
| 2015/0332341 A1 | 11/2015 | Gadoury et al. | |
| 2016/0345074 A1 | 11/2016 | Serbest et al. | |

OTHER PUBLICATIONS

UK Patent Office Search Report dated Mar. 28, 2018 for United Kingdom Patent Application No. GB1716898.0.
International Search Report and Written Opinion dated Dec. 19, 2018 for International Application No. PCT/GB2018/052950, filed Oct. 12, 2018.
UK Patent Office Search Report dated Mar. 27, 2018 for United Kingdom Patent Application No. GB1716894.9.

* cited by examiner

MEDIA BREAK WINDOW

CROSS-REFERENCE TO RELATED APPLICATIONS

The present application claims priority to and is the 35 U.S.C. 371 United States National Phase application based on the International Patent Application No. PCT/GB2018/052949, filed on Oct. 12, 2018, and entitled "Media Break Window", which claims priority to the United Kingdom Patent Application No. 1716898.0, filed on Oct. 13, 2017 and entitled "Media Break Window", the disclosures of which are incorporated herein by reference in their entireties.

TECHNICAL FIELD

This invention relates to the management of breaks during the playout of media.

SUMMARY

Nowadays, media streams such as radio and television stations can be consumed in many ways. An audience member may listen to or watch live programming by receiving an over-the-air broadcast signal through a radio or television receiver, or by receiving a data stream over the internet and playing that data stream through a suitable device, such as a smartphone, tablet or dedicated media player.

Commercial radio and television is often supported by advertising. The advertising is presented during commercial breaks in the primary programming. In traditional broadcast programmes, all listeners or viewers are generally presented with the same advertising during a commercial break. Sometimes, different packages of advertising can be presented in different geographical regions, or when the programming is being broadcast by different broadcasters. For example, a live sports event may pause during a commercial break, and during that break different adverts may be played in different countries.

In contrast, web-based internet advertising is commonly targeted to the specific individual or device that is to receive it. A server that is to provide web-based advertising may have knowledge of information such as the content of cookies stored on the receiving device, the previous usage history of the receiving device, the IP address of the receiving device and the user identity of a user who is logged in on the receiving device. The server has a pool of display advertising available to it. The server applies a predetermined algorithm to the known information to select an advertisement and it serves that advertisement to the receiving device for display as part of a web page. It is believed that targeting advertisements in this way can improve their effectiveness.

It would be desirable to be able to present targeted advertising to people receiving a media stream such as a radio or television programme. FIG. 1 shows a system for playing out targeted advertisements to radio listeners.

The primary programming is generated in a studio 1. The primary programming is fed to a management suite 2, from where it passes to a broadcast facility 3. The broadcast facility transmits the programme by radio waves. The radio waves can be received and decoded by a radio receiver 4 and played out to a listener through a loudspeaker 5 of the radio receiver. The management suite has access to pre-recorded advertising stored in an advertisement store at 6. When it is time for a commercial break, the management suit switches the feed to the broadcast facility 3 to be some of the pre-recorded advertising. Conventionally, the management suite 2 signals to the studio 1 that a commercial break is happening. At the end of the commercial break, the management suit 2 reverts to feeding the output of the studio 1 to the broadcast facility 3.

To allow the programming to be received over the internet, the broadcast feed that is being sent to the broadcast facility 3 can be passed to a media server 7. The media server 7 encodes the broadcast feed into a suitable digital format and transmits it over the internet 8 to any devices that have requested it. An example of such a device is computer 9. Computer 9 receives the media feed, decodes it to audio data and plays that audio data over a loudspeaker 10.

The system shown in FIG. 1 can play out customised advertisements to audience members who are listening over the internet. The media server 7 can communicate with an advertising server 11. The advertising server stores audio data for multiple advertisements. When a commercial break starts, the management suite 2 signals that to the media server 7. The media server then plays out a series of advertisements from the advertising server over the internet, instead of playing the broadcast feed. At the end of the commercial break the management suit signals the media server 7 and the media server 7 reverts to playing out the broadcast feed over the internet. This system means that instead of hearing advertisements from the advertisement store 6, listeners over the internet hear advertisements from the advertising server 11. The media server 7 can provide different advertisements to each listener based on information it has available about their usage history, identity and preferences.

A problem with the system described above is that it can result in a poor-quality audio stream for internet listeners. The media server 7 may take time to select suitable advertisements for a listener, which may mean there is a gap at the beginning of the commercial break when no advertisements are played out to an internet listener. The end of the commercial break might not coincide with the end of an advertisement that is being played out to an internet listener. As a result, an advertisement can be interrupted when the media server 7 reverts to playing out the broadcast stream.

There is a need for an improved approach for inserting advertisements or other messaging in media streams.

According to one aspect there is provided a method for playing out a media program comprising primary programming, the method comprising: forming a first set of content for play-out during a break in the primary programming; storing multiple content items; in advance of the break occurring, signalling the duration of the break to a first server entity and performing, by means of the first server entity, a search for a second set of content, the second set being a set of the stored content items that meet predetermined criteria, the predetermined criteria including that the combined duration of the set matches the duration of the break; performing a first transmitting step comprising transmitting, by a first mechanism, a base program comprising the primary programming and subsequently, during the break, the first set of content; and performing a second transmitting step comprising transmitting, by a second mechanism, the primary programming and subsequently, during the break, the second set of content.

According to a second aspect there is provided a media playout system for playing out a media program comprising primary programming, the media playout system being configured to: form a first set of content for play-out during a break in the primary programming; store multiple content items; in advance of the break occurring, signal the duration of the break to a first server entity and perform, by means of the first server entity, a search for a second set of content, the second set being a set of the stored content items that meet predetermined criteria, the predetermined criteria including that the combined duration of the set matches the duration of the break; perform a first transmitting step comprising transmitting, by a first mechanism, a base program comprising the primary programming and subsequently, during the break, the first set of content; and perform a second transmitting step comprising transmitting, by a second mechanism, the primary programming and subsequently, during the break, the second set of content.

According to a third aspect there is provided a method for playing out a media program comprising primary programming, the method comprising: storing the primary programming; forming a first set of content for play-out during a break in the primary programming; forming a second set of content for play-out during a break in the primary programming, the second set of content being subject to the constraint that its duration differs by less than a predetermined amount from the duration of the first set of content; performing a first transmitting step comprising transmitting, by a first mechanism, a base program comprising the primary programming and subsequently, during the break, the first set of content, and after the break the primary programming; and performing a second transmitting step comprising transmitting, by a second mechanism, the primary programming at a first time offset to the transmitting of the primary programming in the first transmitting step before the break and subsequently, during the break, the second set of content and after the break the primary programming at a second time offset to the transmitting of the primary programming in the first transmitting step after the break, the first and second time offsets being different.

According to a fourth aspect there is provided a media playout system for playing out a media program comprising primary programming, the media playout system being configured to: store the primary programming; form a first set of content for play-out during a break in the primary programming; form a second set of content for play-out during a break in the primary programming, the second set of content being subject to the constraint that its duration differs by less than a predetermined amount from the duration of the first set of content; perform a first transmitting step comprising transmitting, by a first mechanism, a base program comprising the primary programming and subsequently, during the break, the first set of content, and after the break the primary programming; and perform a second transmitting step comprising transmitting, by a second mechanism, the primary programming at a first time offset to the transmitting of the primary programming in the first transmitting step before the break and subsequently, during the break, the second set of content and after the break the primary programming at a second time offset to the transmitting of the primary programming in the first transmitting step after the break, the first and second time offsets being different.

The method may comprise: receiving at a server entity the base program. The second transmitting step may comprise: transmitting, by the second mechanism, the base program; and during the break, interrupting the base program and transmitting, by the second mechanism, the second set of content.

The step of interrupting may be performed in response to receiving a signal indicating the commencement of the break.

The method may comprise determining whether the said search was successful, and: if the search was successful, performing the said step of transmitting, by a second mechanism, the primary programming and, during the break, the second set of content, and otherwise, transmitting during the break by the second mechanism the base program.

The first mechanism may be a broadcast mechanism, for example a radio broadcast mechanism.

The second mechanism may be a unicast mechanism, for example internet streaming. The second mechanism may be a packet streaming mechanism.

The method may comprise: in advance of the break occurring, for each of multiple clients performing, by means of the first server entity, a search for a respective second set of content, each second set being a set of the stored content items that meet predetermined criteria, the predetermined criteria including that the combined duration of the set matches the duration of the break; and transmitting, by the second mechanism, the primary programming to each of the clients and, during the break, each second set of content to the respective client.

The predetermined criteria may include, for each client, information specific to that client.

The said information specific to a client may include one or more of: log-on credentials of that client, a cookie received from that client and behavioural information relating to that client.

The primary programming may be an audio or video programme.

The content items may be advertisements. The lengths of the content items may, to a precision of 1 second or less, all be selected from a set of fewer than 10 lengths.

The method may comprise performing the said search by means of a computer pre-programmed to execute code stored in a non-transitory manner, the code being such that, when executed by the computer it causes the computer to perform the said search.

The method may comprise performing a search for a second set of content, the second set being a set of the stored content items that meet predetermined criteria, the predetermined criteria including that the combined duration of the set matches the duration of the break.

The combined duration of the set may be determined to match the duration of the break if the difference between the combined duration of the set and the duration of the break is less than a predetermined threshold.

The predetermined duration may be less than one second.

The method may comprise storing the primary programming. The first transmitting step may comprise transmitting after the break by the first mechanism the primary programming. The second transmitting step may comprise transmitting after the break by the second mechanism the primary programming. The second transmitting step may comprise transmitting before the break the primary programming at a first time offset to the transmitting of the primary programming in the first transmitting step before the break, and transmitting after the break the primary programming at a second time offset to the transmitting of the primary programming in the first transmitting step after the break, the first and second time offsets being different.

The difference between the first and second time offsets may be equal to a difference between the durations of the first and second sets of content.

The primary programming may be a single media program.

The difference between the first and second time offsets may be equal to a difference between the durations of the first and second sets of content.

The primary programming may be interrupted at the same point in the first and second transmitting steps when the break occurs.

The primary programming may be resumed at the same point in the first and second transmitting steps when the break ends.

The method may comprise receiving at a server entity the base program. The second transmitting step may comprise: transmitting, by the second mechanism, the base program; and during the break, interrupting the base program and transmitting, by the second mechanism, the second set of content.

The primary programming may be a single media program.

The first and second transmission steps may overlap in time. Preferably the timing of the start of the break in each mode of transmission is the same.

The primary programming may be a live programme. Its content may be generated whilst the programme is being played out. The live programme may be buffered so that it is not played out simultaneously with its generation. The offset in time between its generation and playout may be less than 10 seconds, more preferably less than 6 seconds.

BRIEF DESCRIPTION OF THE DRAWINGS

The present invention will now be described by way of example with reference to the accompanying drawings. In the drawings.

DETAILED DESCRIPTION

Figure 2:
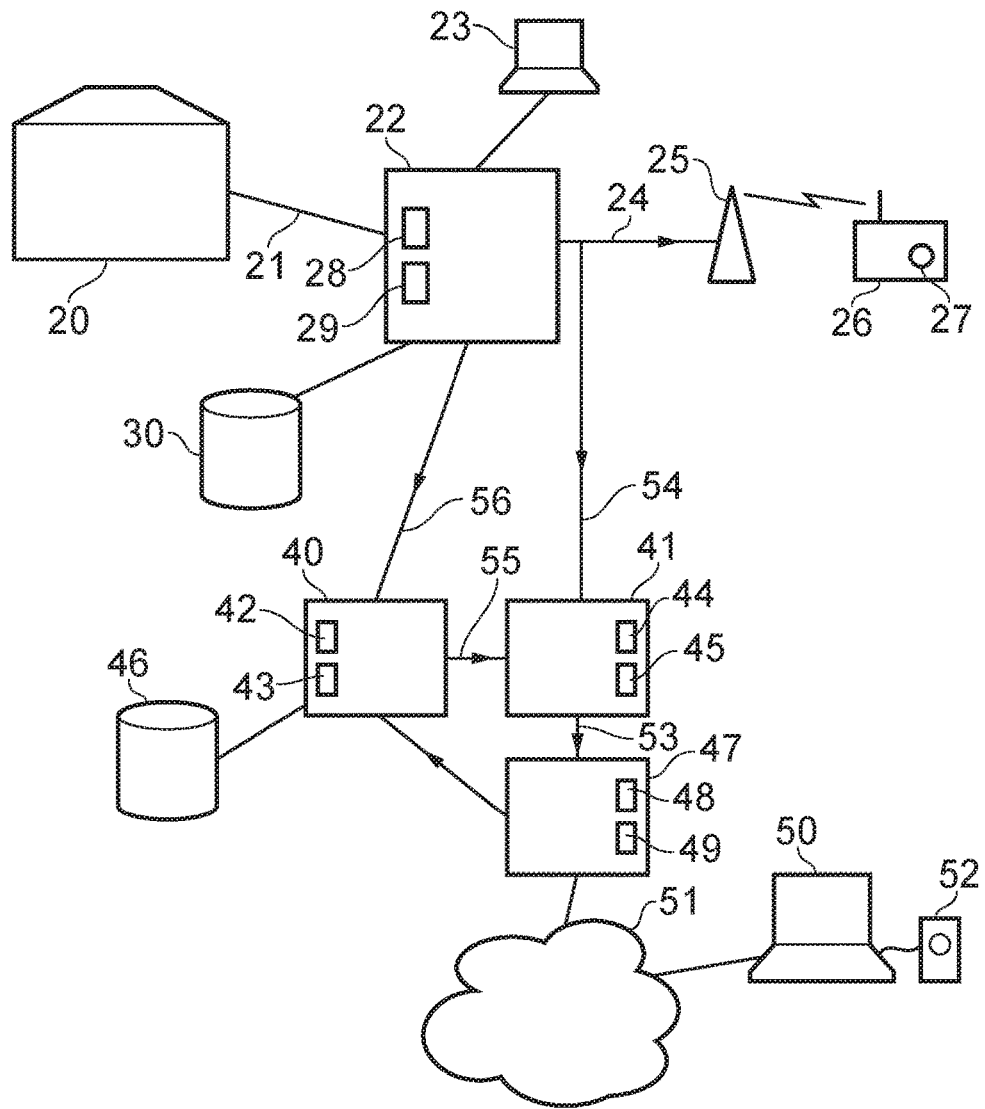
FIG. 2 shows a second media playout system.

FIG. 2 shows a system for broadcasting and playing out an audio programme. As will be described below, analogous systems can be used to broadcast and play out other types of media programme, for example video/television programmes.

A primary programme is generated in a studio 20. In this example, the primary programme is being generated in real time (i.e. simultaneously with it being broadcast), but the primary programme could be pre-recorded and its audio data stored until it is to be broadcast. The primary program is provided as an audio stream at 21. In this example, the audio stream comes from the studio 20, but if the programme has been pre-recorded then it could come from a playback device such as a computer or a dedicated media playback device. The primary programme could comprise music, voice, sports footage and/or commentary, documentary content, drama, instructional programming, news or any other content that consumers might desire to experience. The primary program could be generated and/or stored together with meta data that could be transmitted together with the primary programme. The meta data could, for example, indicate information about the program title, its subject matter, a playlist, a presenter's name or could include hyperlinks to associated media.

The audio stream 21 is passed to a media server 22. The media server can be controlled by a user interface 23. The role of the media server is to manage the insertion of advertisements into commercial breaks in the broadcast version of the primary programme, as will be described in more detail below. The output 24 of the media server is passed to a broadcast facility 25. The broadcast facility could, for example, be an FM (frequency modulation) broadcast facility. The broadcast facility transmits a radio signal representing the output 24. That radio signal can be received by a radio receiver 26. The radio receiver 26 could, for example be a domestic or automotive radio receiver. The radio receiver decodes the radio signal to form an audio signal and plays out the audio signal through its loudspeaker 27. There may be multiple radio receivers, all of which receive the same radio signal and play out the same content. The broadcast signal is not addressed to any specific receiver. The broadcast signal may be sent in a non-packetised format, as, for example, with a conventional FM radio signal. The broadcast signal may be transmitted in analogue or digital form. The broadcast signal is transmitted in real time. There is a predetermined playout time for the primary programme, and the broadcast signal carrying the programme is transmitted at that time.

The media server comprises a processor 28 and a memory 29. The memory stores in a non-transitory form code that is executable by the processor 28 so that the media server can perform the functions described of it herein. The memory 29 also stores working data for allowing the media server to perform its functions.

The media server has access to an advertisement store 30. The media server is controlled through a user interface 23. An operator programs the media server in advance with the times and durations of intended commercial breaks, and the identities of the advertisements from advertisement store 30 which are to be played out in each break. The media server stores that information in memory 29. The duration of each commercial break can be selected so that it exactly matches the combined length of the advertisements that are to be played out in the broadcast stream. This may be fixed in advance or may be varied to match the combined length of the adverts that are available. Normally, the media server forms the broadcast output 24 so that it represents the primary programme audio stream 21. In one arrangement, when the media server determines that the current time matches the start time of a scheduled commercial break it switches to forming the broadcast output 24 so that it represents an advertisement or a series of multiple advertisements. In another arrangement, the start of a commercial break could be signalled manually by an operator, and the media server is configured to switch to forming the broadcast output 24 so that it represents an advertisement or a series of multiple advertisements in response to that signalling. The media server plays out in the broadcast output 24 the advertisements that it has been instructed to provide in that commercial break. When the scheduled duration of the commercial break elapses, the media server reverts to forming the broadcast output 24 so that it represents the primary programme audio stream 21. In that way, an operator can cause the primary programme to be interrupted by a set of selected advertisements which are broadcast to over-the-air listeners such as the user of radio receiver 26.

Figure 1:
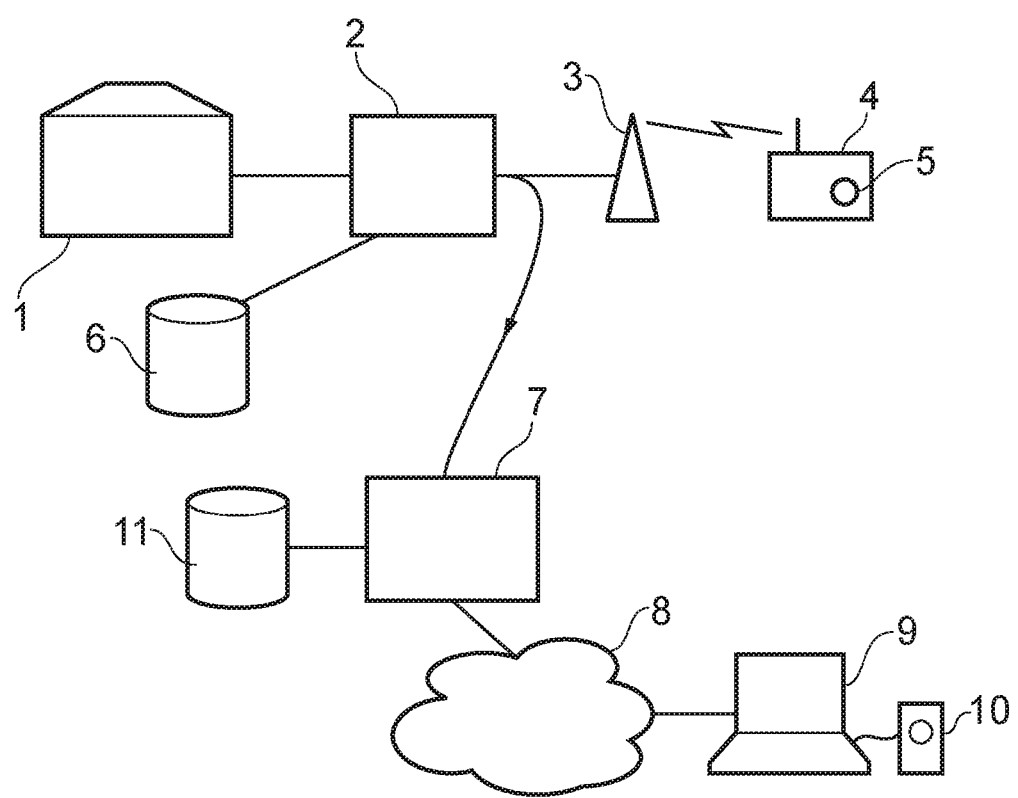
FIG. 1 shows a first media playout system.

The system of FIG. 1 also includes an advertising server 40 and an insertion server 41. The advertising server comprises a processor 42 and a memory 43. The memory stores in a non-transitory form code that is executable by the processor 42 so that the advertising server can perform the functions described of it herein. The memory 43 also stores working data for allowing the advertising server to perform its functions. The insertion server comprises a processor 44 and a memory 45. The memory stores in a non-transitory form code that is executable by the processor 44 so that the insertion server can perform the functions described of it herein. The memory 45 also stores working data for allowing the insertion server to perform its functions. In general terms, the function of the advertising server and the insertion server is to form one or more audio streams for transmission to listeners over the internet, with advertisements that may be different from those in the broadcast feed 24 and may be different for different internet listeners.

The advertising server 40 has access to an advertisement database 46 which stores data defining multiple advertisements. In practice, this could be the same as database 30, or different. For each advertisement, the database 46 stores the audio content for that advertisement. It also stores the duration of the advertisement, either explicitly or by its being computable from a file in which the audio is held. Optionally, it also stores targeting data for the advertisement. The targeting data is data that can be used to help determine listeners to whom that advertisement should be played. The targeting data could, for example, indicate attributes of the advertisement such as its subject matter and characteristics of its target audience (e.g. their location, interests or estimated ages).

A front-end server 47 implements a communication protocol for communicating with clients over the internet. The front-end server comprises a processor 48 and a memory 49. The memory stores in a non-transitory form code that is executable by the processor 48 so that the front-end server can perform the functions described of it herein. The communication protocol could, for example, be HTTP, HTTPS or a dedicated communication protocol. When a user of a client device 50 wishes to receive the media stream the user operates the client device to establish a communication channel or connection over the internet 51 with the front-end server 47. This may be done using a web browser or a dedicated communication application on the client device. When the connection is set up the front-end server may collect behavioural information about the user or the client, for example log-in credentials, cookies or the IP address of the client. The front-end server stores that information. Once a connection is established, the front-end server may offer a single media stream, or it may permit the user to select from multiple media streams: for example different radio stations from which the user can select one. The front-end server then receives the appropriate media stream from the insertion server 41, packages it in a suitable way to be conveyed over the connection (e.g. by packet streaming) and transmits it to the client device. The client device can then decode the media stream and play it out using loudspeaker 52, headphones or other audio output means. The front-end server can support connections to multiple client devices simultaneously. Preferably, each client device has a specific logical data connection over which it receives the media stream from the front-end server: i.e. in a unicast manner. The front-end server can transmit one or more media streams received from the insertion server to the clients simultaneously.

There can be multiple client devices having connections simultaneously to the front-end server 47, and simultaneously receiving media streams from the front-end server. Those media streams could represent the same or different primary programmes. For example, they could represent the current primary programme(s) on the same or different radio channels. The client device 50 could, for example, be a computer, smartphone, tablet or dedicated media player.

When the media is other than just an audio stream, the client device has a suitable decoder for decoding the stream to form that media, and a suitable presentation system (e.g. comprising a loudspeaker, visual display or haptic output).

Figure 3:
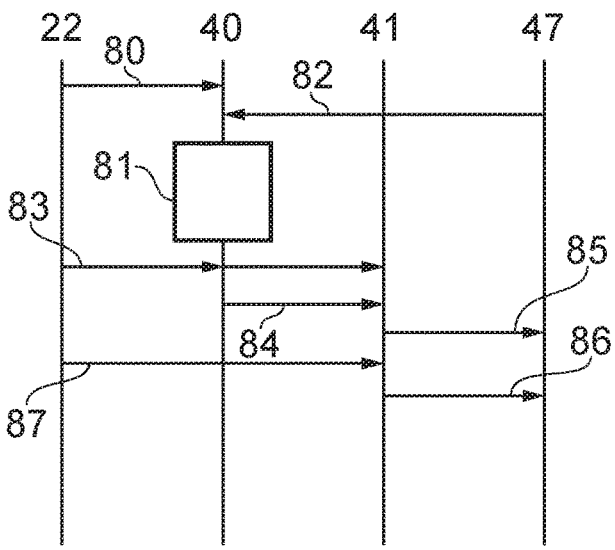
FIG. 3 shows communications between a media server, an advertisement server and an insertion server.

FIG. 3 shows the signalling that takes place when a break occurs in the primary media stream. The media server 22 determines that a break is imminent. It may determine this because the break has been previously scheduled and stored in its memory, or the break may be indicated in an ad hoc manner to the media server from the control interface 23. At step 80 the media server signals the duration of the break to the advertising server 40. The advertising server then determines whether it can find a set of advertisements to exactly fill the duration of the break. It does this by interrogating the advertisement database 46 to search for a suitable set of advertisements. (Step 81). In a simple example, the advertising server may simply look for any set of one or more advertisements available in the advertisement database which exactly fill the duration of the break. In practice, the advertising server may apply an algorithm to select the advertisement(s) in one or more of the following ways:

The selection may be made in dependence on scheduling information indicating when or in what type of media program an advertisement is to be played out.

The advertising server may select a single set of one or more advertisements which are to be played out during the break to all the internet clients. Alternatively, it may select a specific set of advertisements for each client. The selection of a specific set of advertisements for a client may be made in dependence on the behavioural information collected about that client. That behavioural information can be transmitted by the front-end server to the advertising server in step 82. The advertising server may use the value of bids made by advertisers in respect of clients having particular types of behavioural information in order to select a set of one or more advertisements for each client.

Because the fact that a break is imminent is signalled to the advertising server 40 in advance of the break, the advertising server can have time to select a suitable set of advertisements, and potentially specific sets of advertisements for each of many clients who are consuming the media over the internet. The advertising server may select advertisements only for the set of clients who are consuming media during step 81. This can reduce resources in comparison to an alternative approach in which the advertising server might select advertisements before it knows that a break is imminent. Instead of the media server signalling the duration of the break to the advertising server it could simply signal that a break is imminent. The advertising server could be pre-programmed with the lengths of expected breaks, or the lengths of breaks could be fixed and predetermined: e.g. 90 seconds.

When the break commences, the media server signals that fact to the advertising server 40 over link 56. (Step 83). Subsequently, and optionally in response to the server 40 receiving the signal at step 83, the advertising server signals the insertion server 41 over link 55 with either (a) a media stream of the selected set of advertisements or (b) an indication that it has failed to find a suitable set of advertisements to exactly fill the break. (Step 84). If the advertising server is programmed to form a single set of advertisements for all the internet clients then it may provide one such signal to the insertion server. Alternatively, if it is programmed to form a specific set of advertisements for each internet client then it can provide multiple such signals to the insertion server. Some reasons why the insertion server might have failed to form a suitable set of advertisements include:

there being no set of advertisements available for play-out in the database 46 which exactly match the length of the break;

the advertising server 40 having had insufficient time to select a set of advertisements for all the internet clients, in which case it might only have formed sets of advertisements for some of those clients and might only provide advertisements to that subset of the clients;

in respect of a specific internet client, that client having established a connection to the front-end server so soon before the start of the break that the advertising server 40 has been unable to form a set of advertisements for it;

no suitable advertisement or set of advertisements being identified for the target client, for example because the behavioural information available about that client does not match sufficient stored advertisements according to the algorithm used to select the advertisements.

The insertion server provides media streams to the front-end server 47 over link 53 for play-out to internet clients. Outside breaks the insertion server provides the front-end server with the media stream it receives from the media server. If at step 84 the insertion server receives a media stream of a set of advertisements then instead of providing the front-end server with the media stream from the media server as received over link 54 it provides the front-end server with the media stream of advertisements received over link 55. This results in the advertisements that are being provided to radio listeners being replaced for internet clients with advertisements from the advertising server 40. This option is illustrated at step 85. This may be done for all internet clients or on a per-client basis. In other words, insertion server may provide the front-end server with the same media stream of advertisements for all the internet clients, or the insertion server may provide the front-end server with different media streams for different internet clients. Alternatively, if at step 84 the insertion server receives an indication that no suitable advertisements are available then it continues to provide the front-end server with the media stream it receives from the media server. This results in the advertisements that are being provided to radio listeners being also provided to one or more internet clients. Again, this may be done for all internet clients or on a per-client basis.

At the end of the break, the insertion server reverts to providing the front-end server with, for all internet clients, the media stream it receives from the media server. (Step 86). This results in the internet clients reverting to receiving the program stream. The insertion server may become aware of the end of the break because the advertising stream from the advertising server (which has been selected to have the same duration as the break) comes to an end. More preferably, the media server signals the insertion server to indicate the end of the break. (Step 87).

Because the advertising server has selected the or each set of advertisements to have the same duration as the break that is implemented in the program stream, internet clients do not experience a gap at the end of the break, or an advertisement being interrupted when the primary programme resumes.

A primary programme may contain multiple breaks. It is possible that in one break the search for a suitable set of advertisements for a client is successful, resulting in that set being streamed to the client, whereas in another break the search is unsuccessful, resulting in the advertisements received over link 54 being streamed to the client.

Preferably each advertisement available to the advertising server has a length that is an integer multiple of a predetermined time (e.g. 1 second or 5 seconds). This makes it easier for the advertising server to find sets of advertisements that, in aggregate, match the length of the break. The advertising server may consider a set of advertisements to match the length of the break when their total duration is within a predetermined threshold of the length of the break. The predetermined threshold represents the length of a tolerable level of gap or interruption. The predetermined threshold may, for example be 1 or 2 seconds. Since a gap is less obtrusive than an interruption, the advertising server may be constrained to select sets of advertisements that do not exceed the length of the break.

When the break commences, the media server may signal that fact to the insertion server 41 over link 54. (Step 83). When the start and/or end times of a break are signalled directly to the insertion server, this allows the insertion server to interrupt and resume provision of the media stream from the media server at a precise time. This improves the quality of the audio provided to internet clients by avoided unwanted gaps or clipping.

In the description above, the media streams have been referred to as audio and/or radio streams. In practice, the media streams could include any suitable forms of media and could be provided over any suitable channels. The media streams could, for example, include visual media (e.g. video), gaming feeds, virtual reality feeds or text feeds. The broadcast channel for the media streams could, for example, be a long-range terrestrial radio channel (e.g. MF, HF, VHF or UHF), a satellite downlink or a cable feed. The receivers used for receiving the broadcast channel could be any appropriate receiver, for example a television, set-top box, cable modem or satellite receiver. The receiver could be integrated with means for playing out the received data, or remote from it: for example, the signal could be received by a satellite dish and played out through a television. Instead of a radio, another playout device suitable to the type of media being received could be received. The playout device could have a visual output such as a display screen, an audio output such as a loudspeaker and/or a tactile or kinematic output. Instead of receiving the media over the internet, the client(s) 51 could receive the media over another network. Preferably that is a publicly accessible network. It will be appreciated that in different implementations the descriptions above of "radio", "audio", "media server" and so on should be adapted accordingly.

The streaming signal(s) from the front-end server 47 to clients may be transmitted in real time. There is a predetermined playout time for the primary programme, which may be a single media program such as a specific show, and the streaming signal(s) carrying the programme(s) may be transmitted at that time. Alternatively or in addition, the streaming signals may be transmitted after the predetermined playout time; that is after the first playout of the primary programme by the broadcast route. In this way, a so-called catch-up service may be provided.

The approach described above can allow breaks in streamed media to exactly match the breaks in corresponding broadcast media. That can conveniently happen because advertisements may be constrained to be of one of a set of predetermined lengths, for example 15, 20 or 30 seconds. However, it may happen that there is a discrepancy in the length of an advertisement: for example it may be 90 ms shorter than 20 seconds. This can be accommodated in the following way. The programming that is to be played out is buffered in memory 29. In the case of programming that is being generated live, the programming is played out an amount of time after it has been generated. That amount of time may, for example, be 5 seconds. That means that there is scope to advance play-out of the programming if required. In the case of pre-generated programming, the entire programming is stored in advance, so it can also be advanced if required. A threshold is defined within which a set of advertisements generated by advertising server 41 will be deemed to match the length of the break. That threshold may for example be one second or less than one second, 500 ms or less than 500 ms, 200 ms or less than 200 ms or 100 ms or less than 100 ms. It may then happen that the set of advertisements to be streamed to a client 50 during a break is of a different length to the set of advertisements to be broadcast to a client 26 during a break. This can be accommodated by altering the amount by which the primary programming is delayed when played out by one or both mechanisms before and after the break. If the offset between the timing of the playout of the primary programming is $t_1$ before the break and for a particular client 50 $t_2$ after the break (where the offset is defined as the amount that the broadcast programming is in advance of the streaming programming at the relevant time, and could be positive, negative or zero), and the duration of the break and/or the break content is $d_1$ in the broadcast stream to client 26 and $d_2$ in the streamed data to the said particular client 50, $t_2$ may be chosen so that $t_2=t_1+d_1-d_2$. The primary program can be resumed at the same point by each playout mechanism after the break, but with a different time offset between the two than before the break. If desired, the speed of playout via one or both mechanisms may then be altered so as to tend to reduce the time offset.

The content to be inserted in a break could be commercial advertisements, trailers or other forms of message such as public service announcements. A user could opt (e.g. on payment) to receive other content during a break, for example advertisement-free media, in which case that programming could also be selected in the manner described above to match the lengths of the breaks.

Each of the servers 22, 40, 41, 47 described above could be provided by a respective hardware device. Alternatively, those servers could be coalesced physically in any convenient combination. The functions described of a particular server above may be provided by a single device or functional element, or may be divided up in any convenient way.

During a break, the insertion server 41 could receive the primary program stream from the media server 42 containing the advertisements selected by the media server. Alternatively, the insertion server could receive the advertisements selected by the media server in a different stream and could provide that stream as appropriate to the front-end server 47.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for playing out a media program including a primary programming, the method comprising:
   storing the primary programming;
   forming a first set of content for play-out during a break in the primary programming;
   forming a second set of content for play-out during a break in the primary programming, the second set of content being subject to a constraint that its duration differs by less than a predetermined amount from a duration of the first set of content;
   first transmitting, by a first mechanism, a base program including the primary programming and subsequently, during the break, the first set of content, and, after the break, the primary programming; and
   second transmitting, by a second mechanism, the primary programming at a first time offset to the transmitting of the primary programming in the first transmitting before the break and subsequently, during the break, the second set of content and, after the break, the primary programming at a second time offset to the transmitting of the primary programming in the first transmitting after the break, the first and second time offsets being different.

2. The method as claimed in claim 1, wherein the predetermined amount is less than one second.

3. The method as claimed in claim 1, wherein a difference between the first and second time offsets is equal to a difference between the durations of the first and second sets of content.

4. The method as claimed in claim 1, wherein the primary programming is interrupted at the same point in the first and second transmitting when the break occurs.

5. The method as claimed in claim 1, wherein the primary programming is resumed at the same point in the first and second transmitting when the break ends.

6. The method as claimed in claim 1, comprising:
   receiving, at a server, the base program, and
   wherein the second transmitting includes
     transmitting, by the second mechanism, the base program; and
     during the break, interrupting the base program and transmitting, by the second mechanism, the second set of content.

7. The method as claimed in claim 6, wherein the interrupting is performed in response to receiving a signal indicating a commencement of the break.

8. The method as claimed in claim 1, further comprising during at least one break, determining that the second set of content is not available; and
   in response to the determining, performing the second transmitting, by the second mechanism, the primary programming and, during the break, the second set of content, and
   otherwise, transmitting, during the break, by the second mechanism, the base program.

9. The method as claimed in claim 1, wherein the first mechanism is a broadcast mechanism.

10. The method as claimed in claim 1, wherein the first mechanism is a radio broadcast mechanism.

11. The method as claimed in claim 1, wherein the second mechanism is a unicast mechanism.

12. The method as claimed in claim 1, wherein the second mechanism is a packet streaming mechanism.

13. The method as claimed in claim 1, further comprising:

in advance of the break occurring, for each of multiple clients performing, sing the first server, a search for a respective second set of content, each second set being a set of the stored content items that meets predetermined criteria, the predetermined criteria including that the combined duration of the second set matches the duration of the break; and transmitting, by the second mechanism, the primary programming to each of the clients and, during the break, each second set of content to the respective client.

14. The method as claimed in claim 13, wherein the predetermined criteria include, for each client, information specific to that client.

15. The method as claimed in claim 14, wherein the information specific to a client includes at least one of the following: log-on credentials of that client, a cookie received from that client, behavioral information relating to that client, and any combination thereof.

16. The method as claimed in claim 13, further comprising performing the search using a computer pre-programmed to execute code stored in a non-transitory manner, the code being such that, when executed by the computer it causes the computer to perform the search.

17. The method as claimed in claim 1, wherein the primary programming includes at least one of the following: an audio program, a video program, and any combination thereof.

18. The method as claimed in claim 1, wherein the content items are advertisements.

19. The method as claimed in claim 1, wherein the primary programming is a single media program.

20. A media playout system for playing out a media program including a primary programming, the media playout system including at least one programmable processor; and a non-transitory machine-readable medium storing instructions that, when executed by the at least one programmable processor, cause the at least one programmable processor to perform operations comprising:

storing the primary programming;

forming a first set of content for play-out during a break in the primary programming;

forming a second set of content for play-out during a break in the primary programming, the second set of content being subject to a constraint that its duration differs by less than a predetermined amount from a duration of the first set of content;

first transmitting, by a first mechanism, a base program including the primary programming and subsequently, during the break, the first set of content, and, after the break, the primary programming; and second transmitting, by a second mechanism, the primary programming at a first time offset to the transmitting of the primary programming in-the first transmitting before the break and subsequently, during the break, the second set of content and, after the break, the primary programming at a second time offset to the transmitting of the primary programming in the first transmitting after the break, the first and second time offsets being different.

21. A computer program product for playing out a media program including a primary programming, the computer program product comprising a non-transitory machine-readable medium storing instructions that, when executed by at least one programmable processor, cause the at least one programmable processor to perform operations comprising:

storing the primary programming;

forming a first set of content for play-out during a break in the primary programming;

forming a second set of content for play-out during a break in the primary programming, the second set of content being subject to a constraint that its duration differs by less than a predetermined amount from a duration of the first set of content;

first transmitting, by a first mechanism, a base program including the primary programming and subsequently, during the break, the first set of content, and, after the break, the primary programming; and second transmitting, by a second mechanism, the primary programming at a first time offset to the transmitting of the primary programming in-the first transmitting before the break and subsequently, during the break, the second set of content and, after the break, the primary programming at a second time offset to the transmitting of the primary programming in the first transmitting after the break, the first and second time offsets being different.

* * * * *